(12) United States Patent
Igarashi

(10) Patent No.: US 8,478,866 B2
(45) Date of Patent: Jul. 2, 2013

(54) DEVICE MANAGEMENT APPARATUS, CONTROL METHOD, AND STORAGE MEDIUM

(75) Inventor: Toshiaki Igarashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 270 days.

(21) Appl. No.: 12/795,171

(22) Filed: Jun. 7, 2010

(65) Prior Publication Data
US 2010/0312867 A1 Dec. 9, 2010

(30) Foreign Application Priority Data
Jun. 9, 2009 (JP) .................................. 2009-138237

(51) Int. Cl.
*G06F 15/173* (2006.01)

(52) U.S. Cl.
USPC ....................................................... 709/224

(58) Field of Classification Search
USPC ....................................................... 709/224
See application file for complete search history.

(56) References Cited

U.S. PATENT DOCUMENTS

| 5,913,037 | A | * | 6/1999 | Spofford et al. | 709/226 |
|---|---|---|---|---|---|
| 6,772,204 | B1 | * | 8/2004 | Hansen | 709/220 |
| 6,920,568 | B2 | * | 7/2005 | Igarashi | 726/6 |
| 7,318,093 | B2 | * | 1/2008 | Touboul | 709/223 |
| 7,444,394 | B2 | * | 10/2008 | Igarashi et al. | 709/223 |
| 2003/0005100 | A1 | * | 1/2003 | Barnard et al. | 709/223 |
| 2004/0057441 | A1 | * | 3/2004 | Li et al. | 370/401 |
| 2004/0111494 | A1 | * | 6/2004 | Kostic et al. | 709/220 |
| 2005/0105132 | A1 | * | 5/2005 | Hagiuda | 358/1.15 |
| 2006/0067360 | A1 | * | 3/2006 | Ohara | 370/465 |
| 2006/0161519 | A1 | * | 7/2006 | Stewart et al. | 707/2 |
| 2007/0011294 | A1 | * | 1/2007 | Ohara | 709/223 |
| 2007/0019657 | A1 | * | 1/2007 | Takayama | 370/401 |
| 2008/0098098 | A1 | * | 4/2008 | Onsen | 709/222 |
| 2009/0116404 | A1 | * | 5/2009 | Mahop et al. | 370/254 |
| 2009/0164649 | A1 | * | 6/2009 | Kawato | 709/229 |
| 2009/0193133 | A1 | * | 7/2009 | Torii | 709/230 |
| 2010/0260066 | A1 | * | 10/2010 | August et al. | 370/254 |
| 2011/0085530 | A1 | * | 4/2011 | Hellhake et al. | 370/338 |
| 2012/0014394 | A1 | * | 1/2012 | Ohara | 370/465 |

FOREIGN PATENT DOCUMENTS

| JP | 2003-186765 A | 7/2003 |
|---|---|---|
| JP | 2005-351958 A | 12/2005 |
| JP | 2006-011703 A | 1/2006 |

(Continued)

OTHER PUBLICATIONS

Japanese Office Action for corresponding JP 2009-138237, mail date Apr. 2, 2013.

*Primary Examiner* — Karen Tang
(74) *Attorney, Agent, or Firm* — Rossi, Kimms & McDowell LLP

(57) ABSTRACT

A device management apparatus that enables an information obtaining apparatus to obtain device information from a device management apparatus connected to a first network other than a second network to which the information obtaining apparatus is connected, and manage devices. A communication protocol that can be used by the information obtaining apparatus is extracted from a device information obtaining request from the information obtaining apparatus. When a device connected to the first network is not operating using the communication protocol and is able to activate the communication protocol, the device is requested to activate the communication protocol. When the communication protocol has been successfully activated, and it is necessary to change access settings for the device, the device is requested to change the access settings. When the access settings have been successfully changed, a response concerning device information is created and sent to the information obtaining apparatus.

6 Claims, 15 Drawing Sheets

FOREIGN PATENT DOCUMENTS

| | | |
|---|---|---|
| JP | 2006-085643 A | 3/2006 |
| JP | 2007-300690 A | 11/2007 |
| JP | 2009-177504 * | 1/2008 |
| JP | 2008-102872 A | 5/2008 |

* cited by examiner

FIG.6

| | | 600 | | |
|---|---|---|---|---|
| OBTAINMENT RESULT (610) | \multicolumn{4}{l|}{SUCCESS} |
| RESULT DETAIL (620) | | | | |
| | DEVICE NAME (632) | DEVICE 113 | DEVICE 114 | DEVICE 115 (601) |
| | PRODUCT NAME | MULTIFUNCTIONAL PERIPHERAL A | MULTIFUNCTIONAL PERIPHERAL B | MULTIFUNCTIONAL PERIPHERAL C |
| DEVICE INFORMATION (630) | IPV4 ADDRESS (633) | 123.123.123.113 | 123.123.123.114 | 123.123.123.115 |
| | IPV6 ADDRESS (634) | | | |
| | INFORMATION OBTAINING METHOD (635) | SNMPv3 | SNMPv3 | SNMPv3 |

FIG.7

DEVICE LIST 700

| | 710 | 720 | 730 | 740 | 750 |
|---|---|---|---|---|---|
| | DEVICE NAME | PRODUCT NAME | IPV4 ADDRESS | IPV6 ADDRESS | INFORMATION OBTAINING METHOD |
| 701 | DEVICE113 | MULTIFUNCTIONAL PERIPHERAL A | 123.123.123.113 | 2008:0523:0000:1234: 0001:0002:0003:0113 | SNMPv3 |
| 702 | DEVICE114 | MULTIFUNCTIONAL PERIPHERAL B | 123.123.123.114 | 2008:0523:0000:1234: 0001:0002:0003:0114 | SNMPv3 |
| 703 | DEVICE115 | MULTIFUNCTIONAL PERIPHERAL C | 123.123.123.115 | 2008:0523:0000:1234: 0001:0002:0003:0115 | SNMPv3 |

RESULT: SUCCESS ~760
DETAILED INFORMATION: SUCCESSFULLY OBTAINED.
770

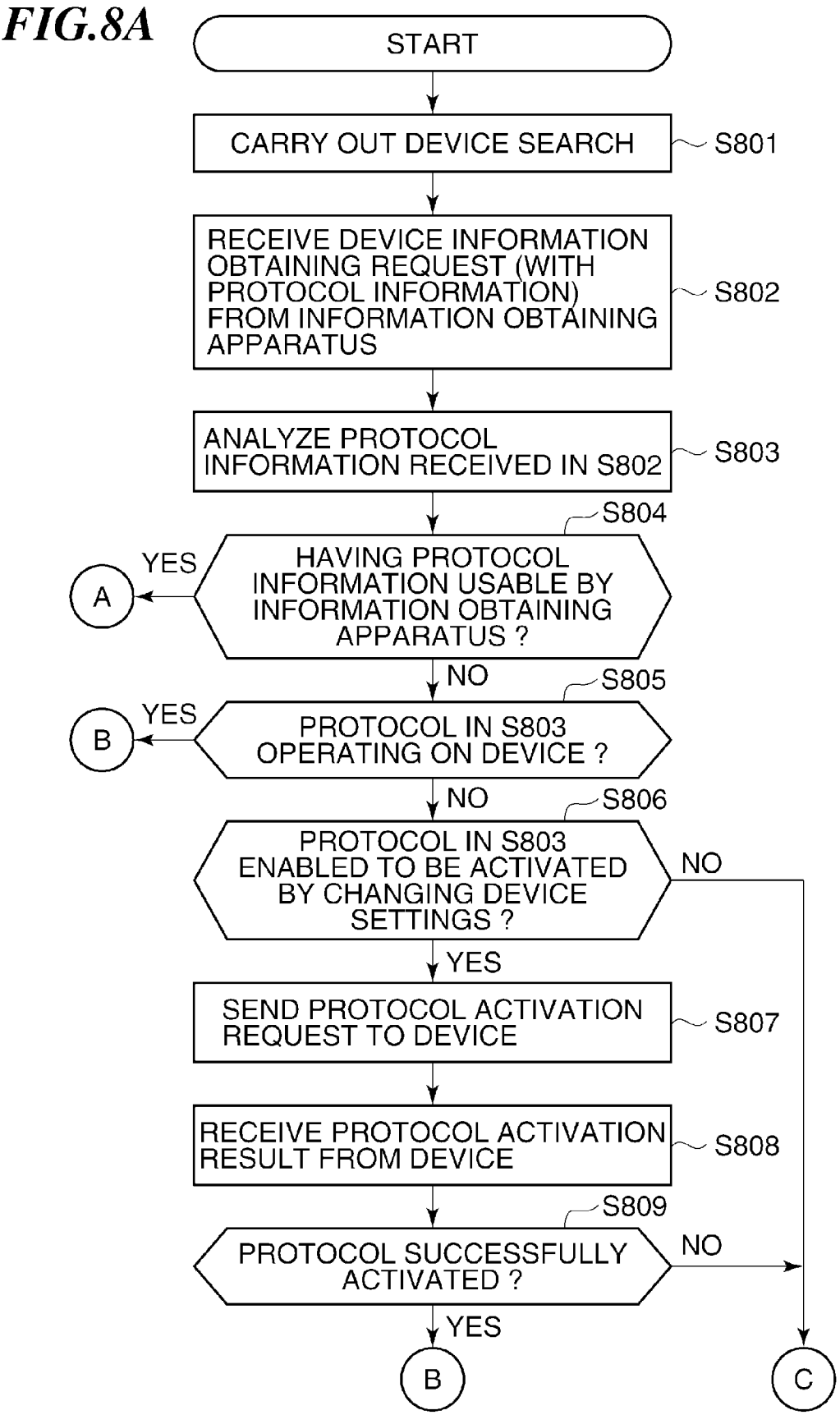

FIG.10

LIST OF DEVICES TARGETED FOR CHANGING OF ACCESS SETTINGS

| DEVICE NAME | PRODUCT NAME | IPV4 ADDRESS | IPV6 ADDRESS |
|---|---|---|---|
| DEVICE 113 | MULTI-FUNCTIONAL PERIPHERAL A | 123.123.123.113 | 2008:0523:0000:1234:0001:0002:0003:0113 |
| DEVICE 114 | MULTI-FUNCTIONAL PERIPHERAL B | 123.123.123.114 | 2008:0523:0000:1234:0001:0002:0003:0114 |
| DEVICE 115 | MULTI-FUNCTIONAL PERIPHERAL C | 123.123.123.115 | 2008:0523:0000:1234:0001:0002:0003:0115 |

☑ ADD DEVICE INFORMATION DESTINATION TO ACCESS PERMISSION LIST

☑ SET SNMPV3 AUTHENTICATION INFORMATION

| USER NAME | user 1 |
|---|---|
| AUTHENTICATION PASSWORD | ******** |
| ENCRYPTION PASSWORD | ******** |
| CONTEXT NAME | abc |

[ OK ]

DEVICE MANAGEMENT APPARATUS, CONTROL METHOD, AND STORAGE MEDIUM

BACKGROUND OF THE INVENTION

1. Field of the Invention

The present invention relates to a device management apparatus that manages network devices connected to a network, a control method, and a computer-readable storage medium storing a program.

2. Description of the Related Art

Conventionally, there has been proposed a method that efficiently manages network devices connected to two or more subnetworks using a network management technique such as SNMP (Simple Network Management Protocol). To manage a plurality of network devices connected to a plurality of subnetworks, there has been proposed a networked device management system in which a representative device is placed in each subnetwork (see, for example, Japanese Laid-Open Patent Publication (Kokai) No. 2003-186765).

In the networked device management system described in Japanese Laid-Open Patent Publication (Kokai) No. 2003-186765, a representative device collects information on other devices in each subnetwork. Then, the representative device sends the device information to a subnetwork representative device. Finally, the subnetwork representative device collects device information on all the devices in the subnetworks and sends the same to a network device management apparatus.

On the other hand, with a recent growing interest in security, IPV6 (Internet Protocol Ver.6) compatible with IPsec (Security Architecture for Internet Protocol) has been becoming widespread. Under such circumstances, part of an environment that has been using IPV4 (Internet Protocol Ver.4) is increasingly replaced with IPV6.

However, when the networked device management apparatus described in Japanese Laid-Open Patent Publication (Kokai) No. 2003-186765 is operated in an environment in which a subnet using IPV6 (referred to as the IPV6 environment) and a subnet using IPV4 (referred to as the IPV4 environment) coexist, a situation explained hereinafter could occur. Specifically, a situation occurs in which a representative device collects device information on the IPV6 environment and sends the device information to the network device management apparatus operating in the IPV4 environment.

In this case, the device information collected by the representative device includes IPV6-related information, and hence the network device management apparatus present in the IPV4 environment cannot manage network devices in the IPV6 environment. Also, assuming that a network device in the IPV6 environment is a network device supporting both IPV6 and IPV4 (referred to as a dual stack device), the device information collected by the representative device includes information on both IPV6 and IPV4.

For this reason, the network device management apparatus present in the IPV4 environment can manage network devices in the IPV6 environment using IPV4, but this means that the network devices are managed outside a constructed high-security environment.

SUMMARY OF THE INVENTION

The present invention provides a device management apparatus that enables an information obtaining apparatus to obtain device information from a device management apparatus connected to a network other than a network to which is connected the information obtaining apparatus, thereby managing devices, a control method, and a computer-readable storage medium storing a program.

Accordingly, in a first aspect of the present invention, there is provided a device management apparatus that is capable of communicating with an information obtaining apparatus operating in a second network connected to a first network, and manages a device connected to the first network, comprising an extracting unit adapted to, when receiving a device information obtaining request from the information obtaining apparatus, extract a communication protocol that can be used by the information obtaining apparatus from the device information obtaining request, a first requesting unit adapted to, when the device connected to the first network is not currently operating using the communication protocol extracted by the extracting unit, and the device is able to activate the communication protocol, request the device to activate the communication protocol, a second requesting unit adapted to, when the device has successfully activated the communication protocol in response to the request from the first requesting unit, and it is necessary to change access settings for the device, request the device to change the access settings, a creating unit adapted to, when the device has successfully changed the access settings in response to the request from the second requesting unit, create a response concerning device information to the information obtaining apparatus, and a sending unit adapted to send the response created by the creating unit to the information obtaining apparatus.

Accordingly, in a second aspect of the present invention, there is provided a control method for a device management apparatus that is capable of communicating with an information obtaining apparatus operating in a second network connected to a first network, and manages a device connected to the first network, comprising an extracting step of, when receiving a device information obtaining request from the information obtaining apparatus, extracting a communication protocol that can be used by the information obtaining apparatus from the device information obtaining request, a first requesting step of, when the device connected to the first network is not currently operating using the communication protocol extracted in the extracting step, and the device is able to activate the communication protocol, requesting the device to activate the communication protocol, a second requesting step of, when the device has successfully activated the communication protocol in response to the request in the first requesting step, and it is necessary to change access settings for the device, requesting the device to change the access settings, a creating step of, when the device has successfully changed the access settings in response to the request in the second requesting step, creating a response concerning device information to the information obtaining apparatus, and a sending step of sending the response created in the creating step to the information obtaining apparatus.

Accordingly, in a third aspect of the present invention, there is provided a non-transitory storage medium storing a program having a computer-readable program code for causing a computer to execute a control method for a device management apparatus.

According to the present invention, the device management apparatus creates a response related to device information and sends the same to the information obtaining apparatus in response to a device information obtaining request from the information obtaining apparatus. This enables the information obtaining apparatus operating in the second network to obtain device information from the device management apparatus connected to the first network other than the second network, and thus it becomes possible for the information obtaining apparatus to manage devices.

Further features of the present invention will become apparent from the following description of exemplary embodiments (with reference to the attached drawings).

BRIEF DESCRIPTION OF THE DRAWINGS

FIG. 6 is a diagram showing an exemplary response to the device information obtaining request command, which is received from the network device management apparatus by the network device information obtaining apparatus.

FIG. 7 is a diagram showing an exemplary device list screen created by the network device information obtaining apparatus.

FIGS. 8A and 8B are flowcharts showing a process carried out when the network device management apparatus has received a device information obtaining request from the network device information obtaining apparatus.

FIG. 10 is a diagram showing an exemplary access setting changing screen for the device, which is displayed by the network device management apparatus.

DESCRIPTION OF THE EMBODIMENTS

The present invention will now be described in detail with reference to the drawings showing an embodiment thereof.

In the description of the present embodiment, it is assumed that a network device information obtaining apparatus in an IPV4 network environment collects device information from a network device management apparatus in an IPV6 network environment to manage devices in the IPV6 network environment.

Figure 1:
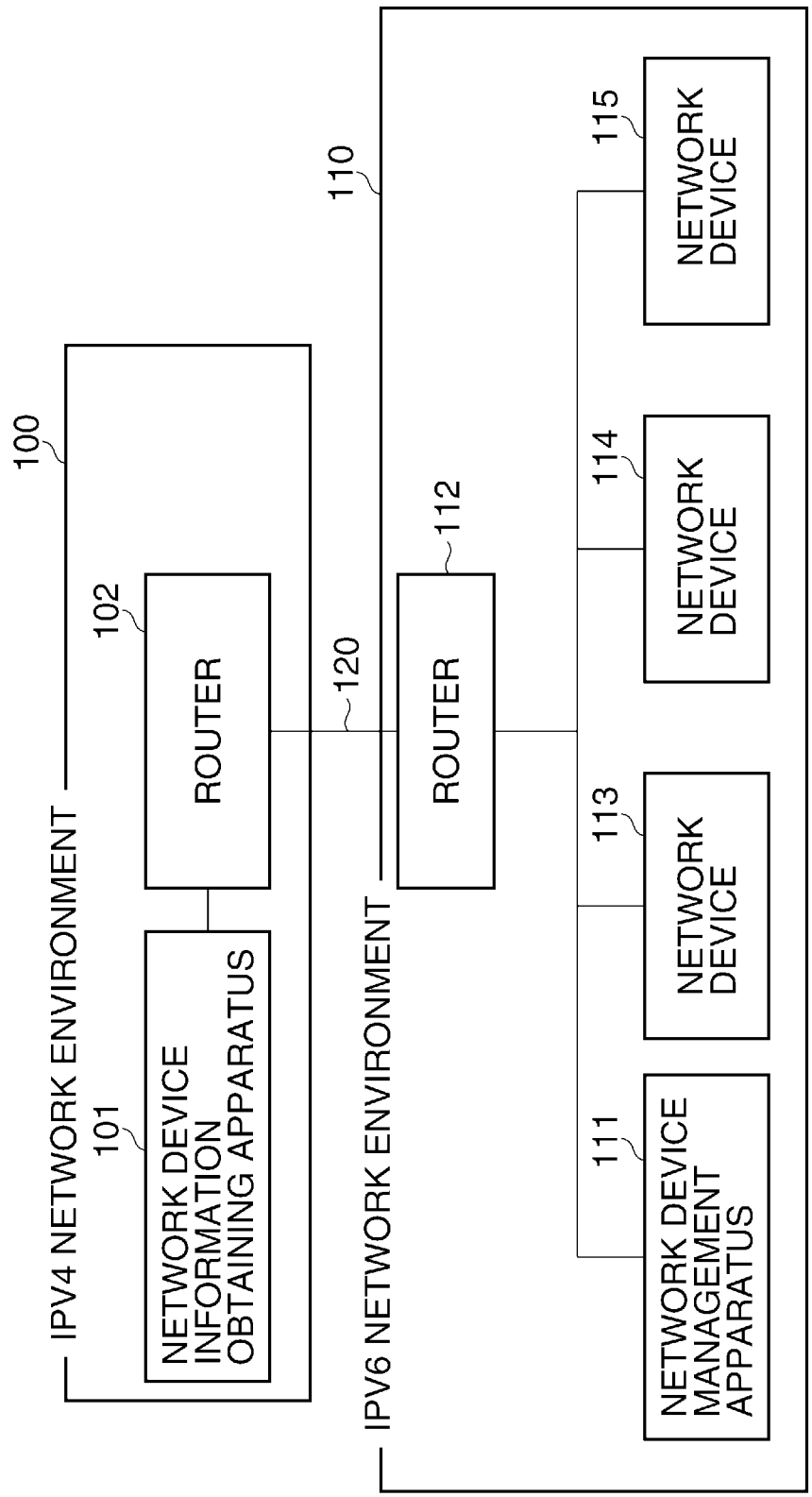
FIG. 1 is a diagram schematically showing an arrangement of a network system according to an embodiment of the present invention.

FIG. 1 is a diagram schematically showing an arrangement of a network system according to the present embodiment.

Referring to FIG. 1, the network system has a network device information obtaining apparatus 101, a router 102, a network device management apparatus 111, a router 112, and network devices 113, 114, and 115. A network 120 connects an IPV4 network environment 100 (a second network) and an IPV6 network environment 110 (a first network) to each other. In the network 120, data of both IPV4 and IPV6 may coexist. It should be noted that in the following description, the network device information obtaining apparatus, the network device management apparatus, and the network devices will be abbreviated to the information obtaining apparatus, the management apparatus, and the devices, respectively.

The information obtaining apparatus 101 obtains device information on the devices 113 to 115 managed by the management apparatus 111. The router 102 is a network relay unit having a function of transferring electronic data according to the IPV4 protocol and the IPV6 protocol. In the present embodiment, it is assumed that the information obtaining apparatus 101 and the router 102 operate in the IPV4 network environment 100.

The management apparatus 111 has two roles. The first role is to obtain information on MIB (management information bases) which devices have, and manages the same as device information. The second role is to send device information of the devices 113 to 115 which the management apparatus 111 manages to the information obtaining apparatus 101 in response to a device information obtaining request issued by the information obtaining apparatus 101. The router 112 is a network relay unit having a function similar to that of the router 102. The devices 113 to 115 are configured as devices having an image forming function (such as a multifunctional peripheral, a copy machine, and a printer).

In the IPV6 network environment 110, the component elements (the management apparatus 111, the router 112, and the devices 113 to 115) communicate with each other using IPV6. However, the management apparatus 111 operates on a dual stack of IPV4 and IPV6 so as to communicate with the information obtaining apparatus 101. Also, the component elements (the management apparatus 111, the router 112, and the devices 113 to 115) may operate on a dual stack of IPV4 and IPV6 by changing their own settings.

Figure 2:
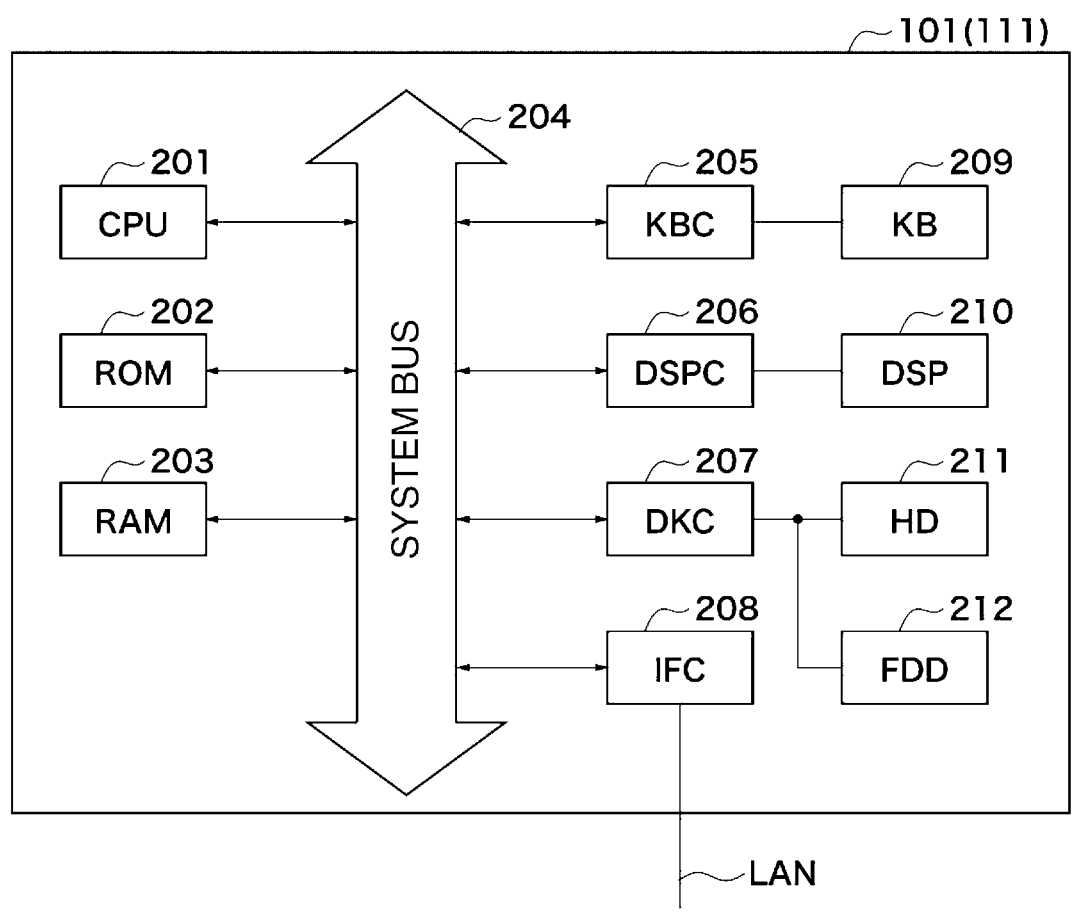
FIG. 2 is a block diagram schematically showing an internal arrangement common to a network device information obtaining apparatus and a network device management apparatus.

FIG. 2 is a block diagram schematically showing an internal arrangement common to the information obtaining apparatus and the management apparatus.

Referring to FIG. 2, the information obtaining apparatus 101 and the management apparatus 111 are each implemented on a personal computer (PC) having illustrated component elements. The information obtaining apparatus 101 and the management apparatus 111 each have a CPU 201, a ROM 202, a RAM 203, a system bus 204, a keyboard controller (KBC) 205, and a display controller (DSPC) 206. The information obtaining apparatus 101 and the management apparatus 111 each further have a disk controller (DKC) 207, an interface controller (IFC) 208, a keyboard 209, a display 210, a hard disk (HD) 211, a floppy (registered trademark) disk drive (hereinafter referred to as the "FD drive") 212.

In the HD 211, programs of information processing software (information processing programs) according to the present embodiment which is an operating entity in the following description are stored. Otherwise specified in the following description, an executing entity is the CPU 201 on hardware. On the other hand, a control entity on software is, for example, an information processing program stored in the HD 211. A process in a flowchart of FIG. 4, described later, is carried out under the control of the CPU 201 of the information obtaining apparatus 101. Also, a process in a flowchart of FIGS. 8A and 8B, described later, is carried out under the control of the CPU 201 of the management apparatus 111.

The ROM 202 stores programs, fixed data, and so on. The RAM 203 acts as a main memory, a work area, and so on for the CPU 201. The keyboard controller 205 controls instruction inputs from the keyboard 209, a pointing device (not shown), and so on. The display controller 206 controls displays on the display 210 (including screen displays in FIGS. 7 and 10).

The disk controller 207 controls access to storage devices such as the HDD 211, an FD in the FD drive 212, a CD-ROM (not shown), and so on. The HD 211 and the FD in the FD drive 212 stores a boot program, an operation system, a database, information processing application programs and their data, and so on. The interface controller 208 sends and receives information to and from other network apparatuses via a LAN (local area network).

It should be noted that in the present embodiment, an information processing program may be supplied in a state of being stored in a storage medium such as an FD or a CD-ROM. In this case, a program is read from the storage medium via the FD drive 212 appearing in FIG. 2, a CD-ROM drive, or the like and installed onto the HD 211.

Moreover, it is assumed in the present embodiment that, for example, Windows (registered trademark) is used as an OS (operating system) running on the information obtaining apparatus 101 and the management apparatus 111, but the present invention is not limited to this.

Figure 3:
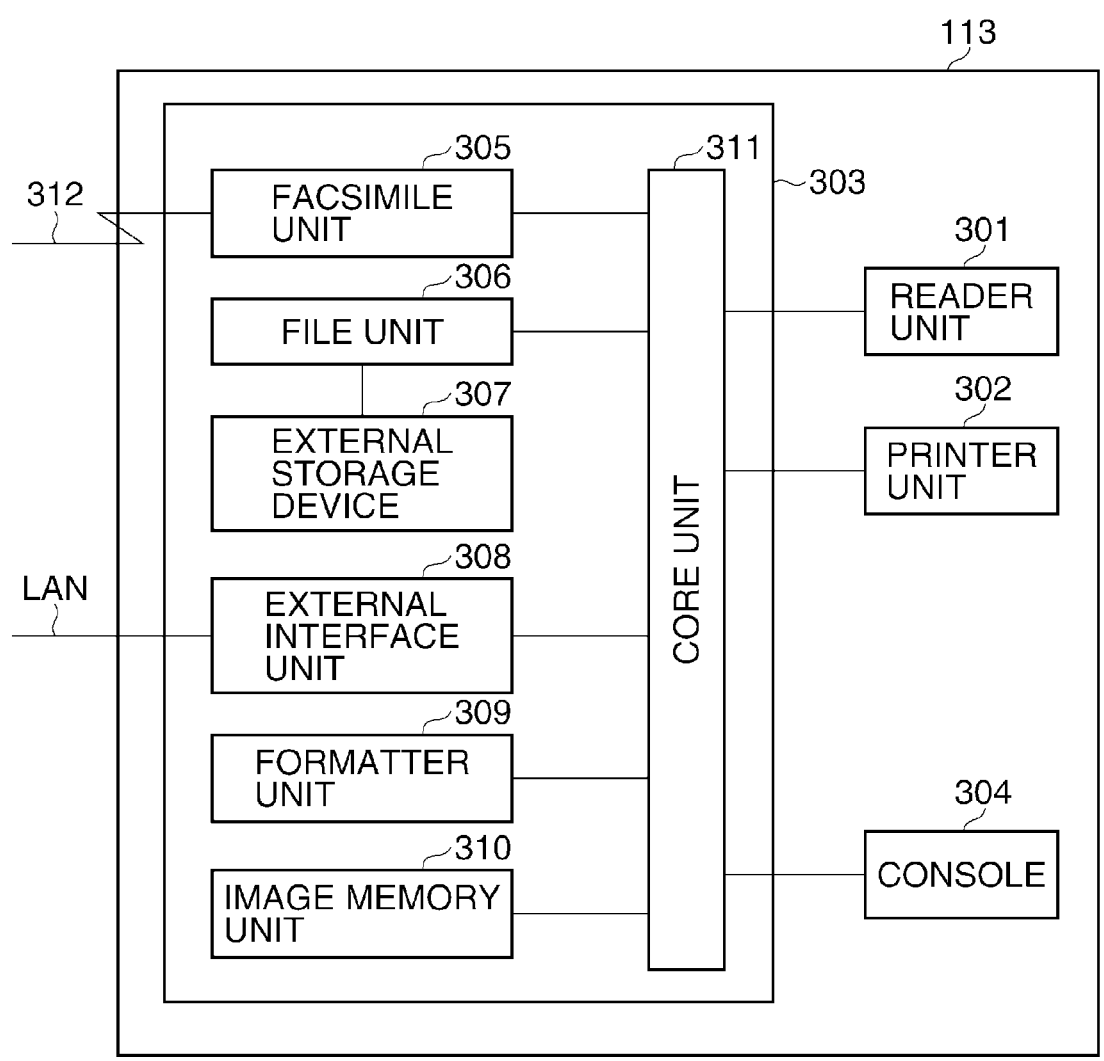
FIG. 3 is a block diagram schematically showing an internal arrangement of a multifunctional peripheral as an exemplary network device.

FIG. 3 is a block diagram schematically showing an internal arrangement of a multifunctional peripheral which is an example of the device 113.

Referring to FIG. 3, the device 113 is configured as a multifunctional peripheral having a scanner function, a printer function, a copy function, and a facsimile (FAX) function, and connected to other network apparatuses via a public line network 312. It should be noted that although in the present embodiment, a multifunctional peripheral is taken as an example of the device 113, the device 113 is not limited to a multifunctional peripheral, but may be any of a digital copy machine, a printer with a copy function, a single-functional printer.

The device 113 is comprised mainly of a reader unit 301, a printer unit 302, an image input-output control unit 303, and a console 304. The console 304 receives input operations from a user. The reader unit 301, which is connected to the printer unit 302 and the image input-output control unit 303, reads images of originals in accordance with instructions from the console 304 inputted by the user, and outputs read image data to the printer unit 302 or the image input-output control unit 303. The printer unit 302 prints image data outputted from the reader unit 301 and the image input-output control unit 303 on recording sheets.

The image input-output control unit 303, which is connected to a LAN and the public line network 312, inputs and outputs image data and further analyzes and controls jobs. The image input-output control unit 303 is comprised of a facsimile unit 305, a file unit 306, an external interface unit 308, a PDL (page description language) formatter unit 309, an image memory unit 310, an image memory unit 310, and a core unit 311.

The facsimile unit 305, which is connected to the core unit 311 and the public line network 312, decompresses compressed image data received from other apparatuses via the public line network 312 and sends the decompressed image data to the core unit 311. Also, the facsimile unit 305 compresses image data sent from the core unit 311 and sends the compressed image data to other apparatuses via the public line network 312.

The file unit 306, which is connected to the core unit 311 and an external storage device 307, causes the external storage device 307, which can be comprised of a hard disk or the like, to store image data and results of execution of apparatus control commands sent from the core unit 311 as well as keywords for finding them. Also, the file unit 306 reads out image data and results of execution of apparatus control commands stored in the external storage device 307 based on keywords sent from the core unit 311, and sends them to the core unit 311.

The external interface unit 308 provides interface between other network apparatuses and the core unit 311. Job control data, image data, and device control commands are sent and received to and from other network apparatuses via the external interface unit 308.

The job control data includes a job control instruction sent with PDL data. Examples of the job control data include data for expanding PDL data and printing the same as image data and then staple-sorting and discharging the printouts.

Examples of the apparatus control commands include (1) an information obtaining command for obtaining a product name of the device 113 and network information on the device 113, and (2) an information distribution command for changing a communication protocol of the device 113 and network information on the device 113.

The formatter unit 309, which is connected to the core unit 311, expands PDL data sent from other apparatuses (for example, a computer) into image data that can be printed by the printer unit 302. The image memory unit 310 temporarily accumulates information from the reader unit 301 and information sent from other apparatuses (for example, a computer) via the external interface unit 308. The core unit 311 controls data and the like flowing between the reader unit 301, the console 304, the facsimile unit 305, the file unit 306, the external interface unit 308, the PDL formatter unit 309, and the image memory unit 310.

Next, a description will be given of processes carried out by the information obtaining apparatus 101, the management apparatus 111, and the device 113 by referring to FIGS. 4 to 13.

Referring first to FIGS. 4, 5, 6, and 7, a description will be given of a process in a case where the information obtaining apparatus 101 obtains device information from the management apparatus 111.

Figure 4:
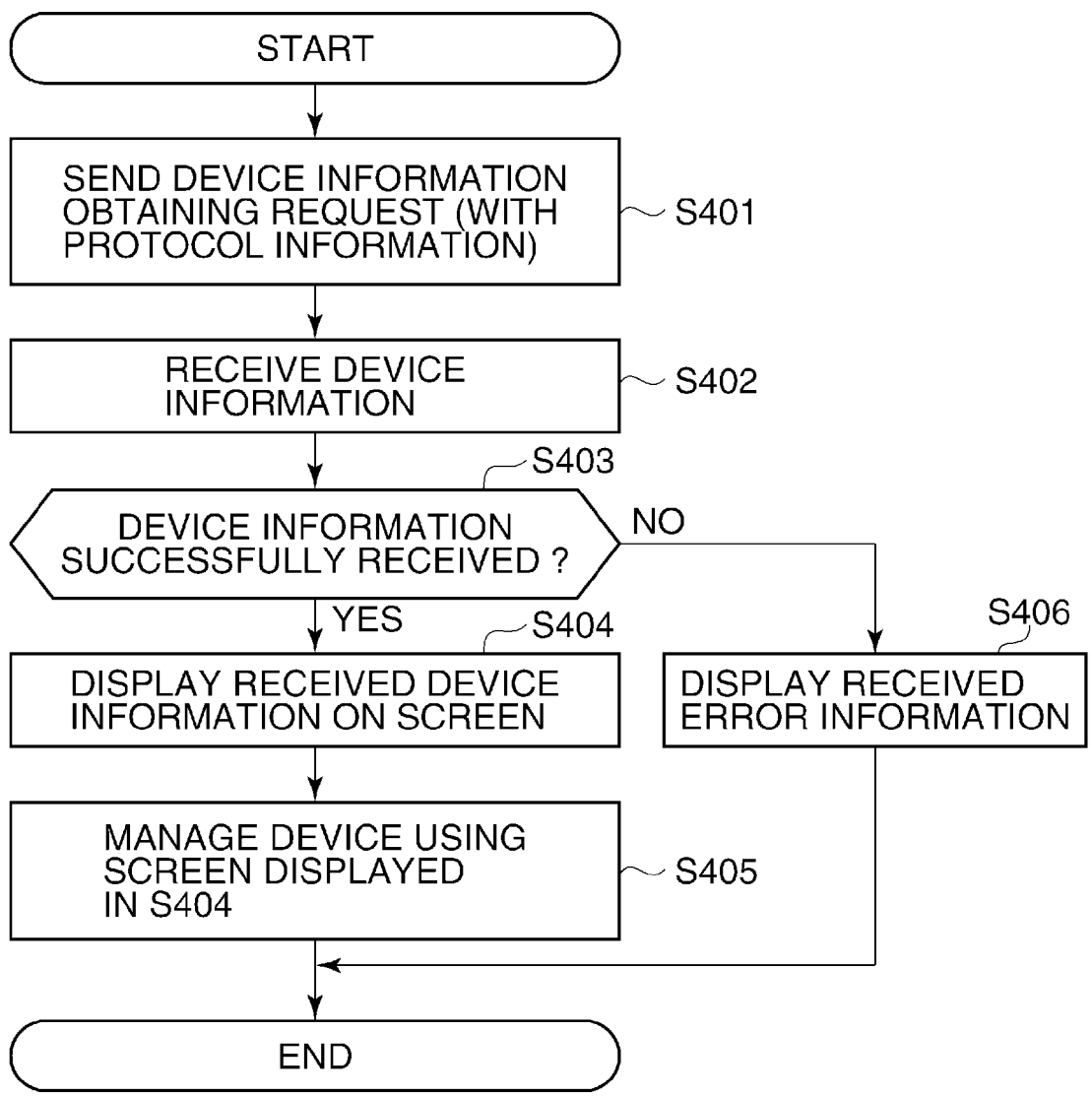
FIG. 4 is a flowchart showing a process carried out when the network device information obtaining apparatus obtains device information from the network device management apparatus.

FIG. 4 is a flowchart showing the process carried out when the information obtaining apparatus 101 obtains device information from the management apparatus 111. This process is carried out under the overall control of the CPU 201 of the information obtaining apparatus 101.

Referring to FIG. 4, upon receiving an instruction from the user via the console 304, the CPU 201 of the information obtaining apparatus 101 sends a device information obtaining request that requests obtainment of device information managed by the management apparatus 111 to the management apparatus 111 (step S401). On this occasion, the CPU 201 of the information obtaining apparatus 101 adds information on a communication protocol that can be used by the information obtaining apparatus itself to the device information obtaining request and sends them to the management apparatus 111.

Figure 5:
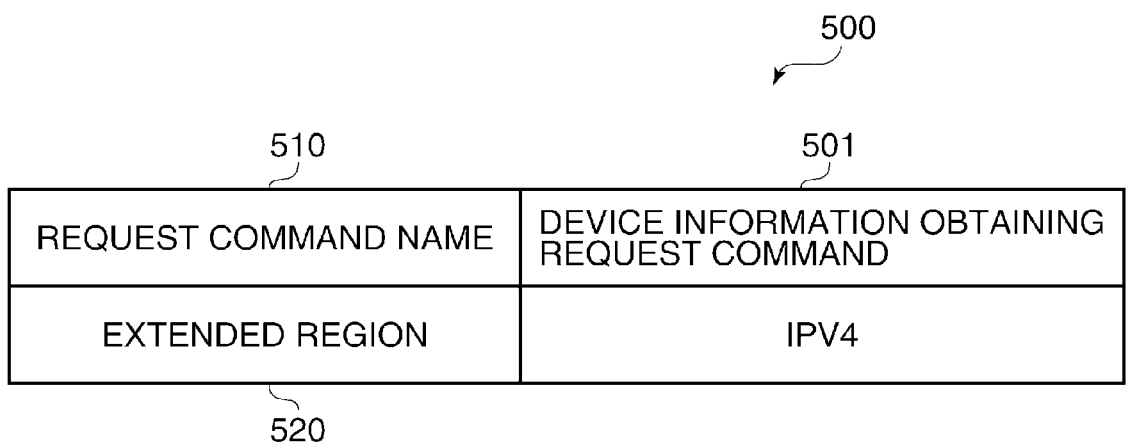
FIG. 5 is a diagram showing an exemplary device information obtaining request command sent from the network device information obtaining apparatus to the network device management apparatus.

FIG. 5 shows an exemplary device information obtaining request command issued by the information obtaining apparatus 101. A command table 500 has a request command name 510 and an extended region 520. The request command name 510 is a region for designating a name of the request command, and a device information obtaining request command 501 is stored therein as a command name. The extended region 520 is a region for designating additional data in response to a command designated in the request command name 510, and IPV4 is stored as a name of a communication protocol that can be used by the information obtaining apparatus 101.

Although in the present embodiment, it is assumed that the command table 500 is provided with the extended region 520, and the extended region is used, the present invention is not limited to this. More simply, a communication protocol used by the information obtaining apparatus 101 when it sends a device information obtaining request command may be a usable communication protocol. In this case, the extended region 520 is not needed.

Referring again to FIG. 4, the CPU 201 of the information obtaining apparatus 101 receives a response from the management apparatus 111 in response to the device information obtaining request command sent to the management apparatus 111 in the step S401 (step S402). The received response is stored in, for example, the RAM 203 or the HD 211.

FIG. 6 shows an exemplary response to the device information obtaining request command, which is received from the management apparatus 111 by the information obtaining apparatus 101. A response table 600 stores the response 601 to the device information obtaining request command, and has an obtainment result 610, a result detail 620, and device information 630.

The obtainment result 610 is a region where a result of the management apparatus 111 processing the device information obtaining request command is stored. In the present example, "success" is stored in the obtainment result 610 as a result of the management apparatus 111 processing the device information obtaining request command. It should be noted that in general, when the obtainment result 610 is "failure", values of respective elements in the device information 630, described later, are invalid or undefined.

The result detail 620 is a region where detailed information on the obtainment result 610 is stored. Particularly, when a value of the obtainment result 610 of the response 601 is "failure", the result detail 620 is used so as to store a reason for this. Examples of the detailed information stored in the result detail 620 include information that "information on the designated communication protocol could not be obtained from a device", and information that "a designated device could not be found". Alternatively, an error code may be defined in advance and stored in the result detail 620.

The device information 630 is a region where device information obtained from the management apparatus 111 is stored, and device information on the devices 113, 114, and 115 is listed. The device information 630 is comprised of a device name 631, a product name 632, an IPV4 address 633, an IPV6 address 634, and an information obtaining method 635.

In the present embodiment, because the information obtaining apparatus 101 operating in the IPV4 network environment cannot use IPV6, the field of the IPV6 address 634 is blank. In the information obtaining method 635, SNMPv3 is designated as an access method to be used when the information obtaining apparatus 101 accesses the devices 113 to 115. It should be noted that as elements of the device information 630, an installation location, a host name, a device status, and so on may be added to the above-mentioned elements.

Referring again to FIG. 4, the CPU 201 of the information obtaining apparatus 101 checks the device information obtainment result 610 stored in the RAM 203 or the HD 211 in the step S402. Further, the CPU 201 of the information obtaining apparatus 101 determines whether or not the information obtaining apparatus 101 has successfully received device information (step S403).

When the information obtaining apparatus 101 has successfully received device information, the CPU 201 of the information obtaining apparatus 101 creates a device list screen using the device information in the device information 630 received in the step S402. Further, the CPU 201 of the information obtaining apparatus 101 causes the DSP controller 206 to display the created device list screen on the display 210 (step S404). When the information obtaining apparatus 101 has not successfully received device information, the CPU 201 of the information obtaining apparatus 101 proceeds to step S406.

FIG. 7 shows an exemplary device list screen created by the information obtaining apparatus 101. A device list is displayed on the device list screen 700. The device list is a list of a device name 710, a product name 720, an IPV4 address 730, an IPV6 address 740, and an information obtaining method 750 with respect to each of component elements 701, 702, and 703 (the device 113, the device 114, and the device 115).

The device name 710 is the same as the value of the device name 631 of the device information 630. The product name 720 is the same as the value of the product name 632 of the device information 630. The IPV4 address 730 is the same as the value of the IPV4 address 633 of the device information 630. The IPV6 address 740 is the same as the value of the IPV6 address 634 of the device information 630. The information obtaining method 750 is the same as the value of the information obtaining method 635 of the device information 630. A result 760 is a display of the obtainment result 610. Detailed information 770 is a display of the result detail 620.

Referring again to FIG. 4, the CPU 201 of the information obtaining apparatus 101 displays the device list screen 700 in the step S404, and then receives a user's operation on the component elements 701 to 703 of the device list screen 700. After that, the CPU 201 of the information obtaining apparatus 101 issues an apparatus control command to the appropriate one of the devices 113 to 115 using the access method in the information obtaining method 750 (step S405). Examples of the apparatus control command include an information obtaining command and an information distributing command as described above.

On the other hand, the device information has not been successfully received (NO in the step S403), the CPU 201 of the information obtaining apparatus 101 reads out the obtainment result 610 and the result detail 620 stored in the RAM 203 or the HD 211. Further, the CPU 201 of the information obtaining apparatus 101 displays them as a result 760 (a display example: "success") and the detailed information 770 (a display example: "successfully obtained") (step S406). This completes the present process.

It should be noted that when the step S406 is to be executed, contents stored in the result 610 and the result detail 620 may be displayed as they are, or may be translated into contents easily understandable by the user by the information obtaining apparatus 101 and then displayed.

Figure 8B:
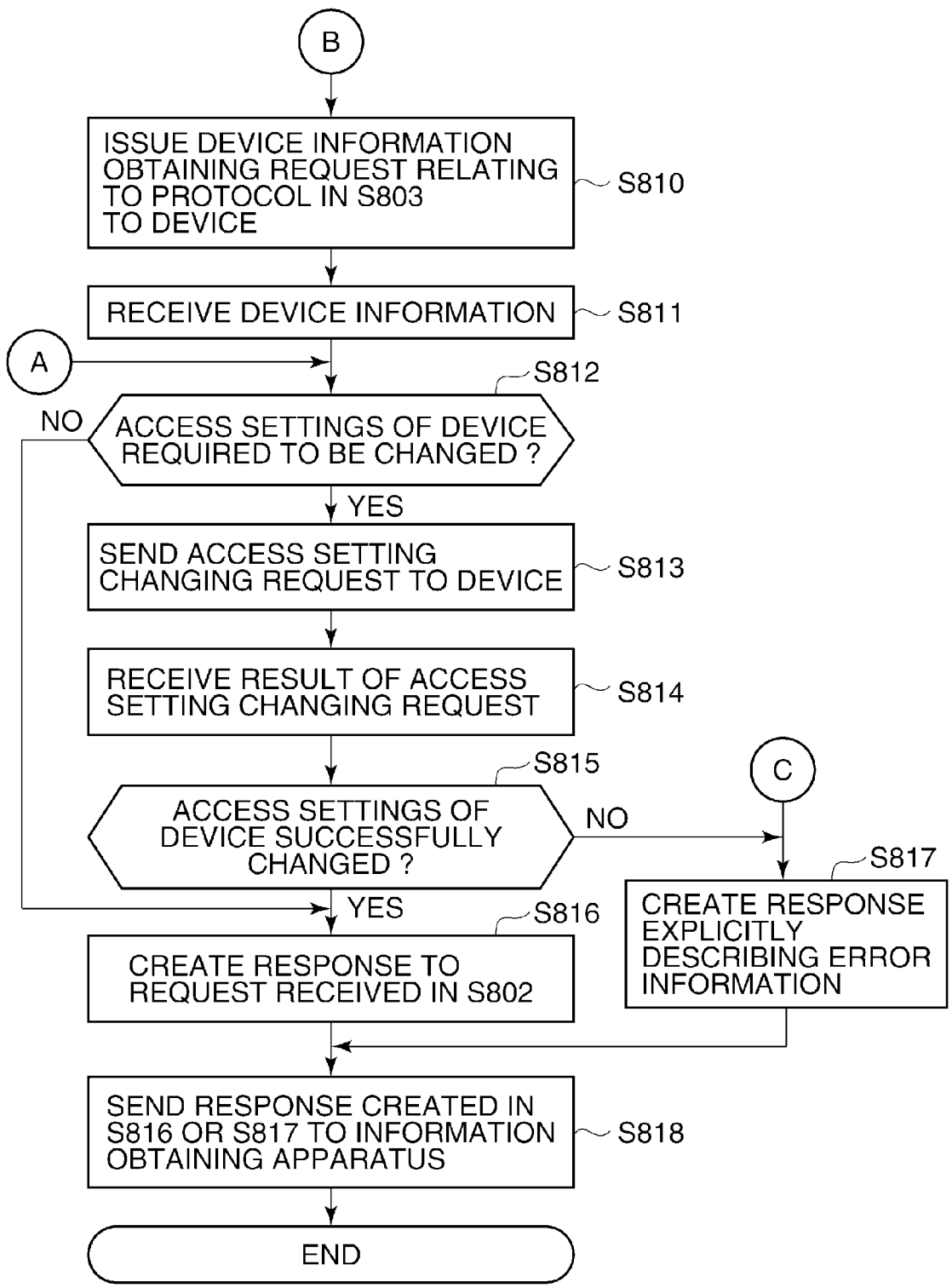
Figure 9:
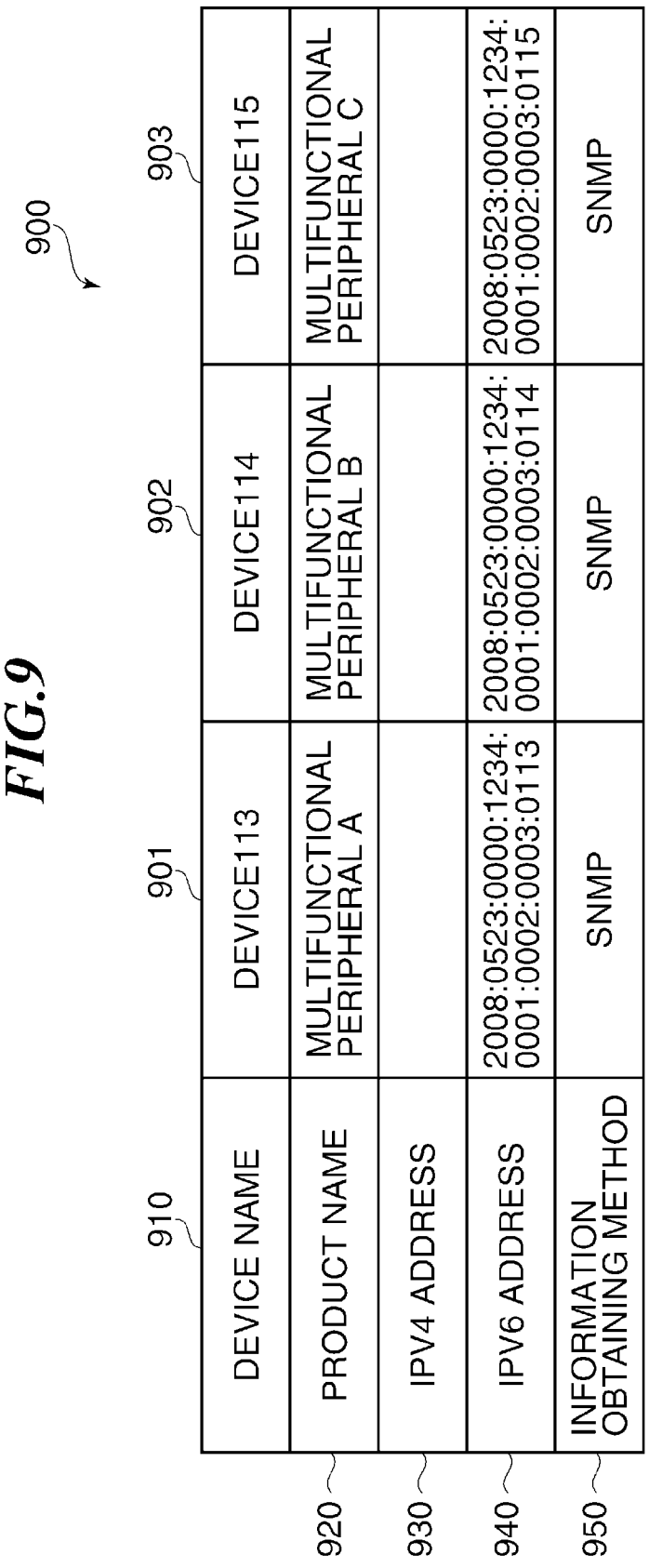
FIG. 9 is a diagram showing exemplary device information obtained through device search by the network device management apparatus.

Referring next to FIGS. 8A, 8B, 9, an 10, a description will be given of a process carried out when the management apparatus 111 has received a device information obtaining request from the information obtaining apparatus 101.

FIGS. 8A and 8B are flowcharts showing the process carried out when the management apparatus 111 has received a device information obtaining request from the information obtaining apparatus 101. This process is carried out under the overall control of the CPU 201 of the management apparatus 111.

Referring to FIGS. 8A and 8B, the CPU 201 of the management apparatus 111 makes a search for devices in the IPV6 network environment 110, and stores the search result as device information in the RAM 203 or the HD 211 of the management apparatus 111 (step S801: an obtaining unit). It should be noted that examples of methods to make a search for devices include methods using SLP (Service Location Protocol) multicast and SNMP multicast of IPV6, but the present invention is not limited to this.

FIG. 9 shows exemplary device information obtained by the management apparatus 111 in the step S801. A device information table 900 is a list of a device name 910, a product name 920, an IPV4 address 930, an IPV6 address 940, and an information obtaining method 950 with respect to each of component elements 901, 902, and 903 (the devices 113, 114, and 115).

Values of the device information on the devices 113, 114, and 115 obtained by the management apparatus 111 in the step S801 are stored in the component elements 901, 902, and 903. The device name 910, the product name 920, the IPV4 address 930, the IPV6 address 940, and the information obtaining method 950 correspond to the device name 631, the product name 632, the IPV4 address 633, the IPV6 address 634, and the information obtaining method 635, respectively, in FIG. 6.

In the present embodiment, because the IPV6 device information is obtained in the step S801, fields of the IPV4 address 930 are blank. In the information obtaining method 950, "SNMP" is stored as an access method for use when the management apparatus 111 manages devices. It should be noted that values stored in the information obtaining method 950 may be different from the access method used in the device search in the step S801. Moreover, similarly to the device information 630 in FIG. 6, an installation location, a host name, a device status, and so on may be added to the above-mentioned ones as elements of the device information table 900.

Referring again to FIG. 8A, the CPU 201 of the management apparatus 111 receives the device information obtaining request sent from the information obtaining apparatus 101 in the step S401 in FIG. 4 (step S802). Then, the CPU 201 of the management apparatus 111 stores the device information obtaining request as well as IP address information on the information obtaining apparatus 101 (which is assumed to be "123.123.123.101" in the present embodiment) in the RAM 203 or the HD 211.

Next, the CPU 201 of the management apparatus 111 analyzes the device information obtaining request received from the information obtaining apparatus 101 in the step S802 (step S803). Specifically, the CPU 201 of the management apparatus 111 extracts a "network protocol that can be used by the information obtaining apparatus 101" from the device information obtaining request (an extracting unit), and stores the same as communication protocol information on the information obtaining apparatus 101 in the RAM 203 or the HD 211.

Then, the CPU 201 of the management apparatus 111 determines whether or not the communication protocol information extracted in the step S803 is included in the device information table 900 obtained by tabulating the device information obtained in the step S801 (step S804). In the present embodiment, because IPV4 is extracted as the communication protocol information, it is determined whether or not information on IPV4 exists in the device information table 900.

When information on the communication protocol that can be used by the management apparatus 111 is included in the device information table 900, the CPU 201 of the management apparatus 111 proceeds to step S812. When the above communication protocol information is not included in the device information table 900, the CPU 201 of the management apparatus 111 determines whether or not each of the devices 113 to 115 is operating using the communication protocol extracted in the step S803 (step S805). In the present embodiment, it is determined whether or not the devices 113 to 115 are operating using IPV4. Examples of determination methods include a method in which the management apparatus 111 issues a PING command to the devices 113 to 115, but the present invention is not limited to this.

When a process is to be continuously carried out on the device on which the communication protocol extracted in the step S803 is operating, the CPU 201 of the management apparatus 111 proceeds to step S810. When a process is to be continuously carried out on the device on which the communication protocol extracted in the step S803 is not operating, the CPU 201 of the management apparatus 111 determines whether or not the device can be enabled to activate the same communication protocol as that of the information obtaining apparatus 101 by changing settings of the device (step S806: a first determination unit). For example, in the present embodiment, when it is possible to obtain an MIB object (such as ipADdEntAddr) indicative of information on IPV4 using SNMP, it can be determined that the device has IPV4.

When the device cannot be enabled to activate the same communication protocol as that of the information obtaining apparatus 101 by changing settings of the device, the CPU 201 of the management apparatus 111 proceeds to step S817. When the device can be enabled to activate the same communication protocol as that of the information obtaining apparatus 101 by changing settings of the device, the CPU 201 of the management apparatus 111 transmits a request for activation of the same communication protocol as that of the information obtaining apparatus 101 to the device (step S807: a first requesting unit). In the present embodiment, it is assumed that the communication protocol activation request is transmitted using SNMP, but any other method may be used.

Next, the CPU 201 of the management apparatus 111 receives a result of execution in response to the request for activation of the same communication protocol as that of the information obtaining apparatus 101 in the step S807, and stores the execution result in the RAM 203 or the HD 211 (step S808). Further, the CPU 201 of the management apparatus 111 analyzes the execution result received in the step S808, and determines whether or not the activation of the communication protocol requested in the step S807 has succeeded (step S809).

When the activation of the communication protocol requested in the step S807 has not succeeded, the CPU 201 of the management apparatus 111 proceeds to the step S817. When the activation of the communication protocol requested in the step S807 has succeeded, the CPU 201 of the management apparatus 111 issues a request for obtaining device information about the communication protocol to the device on which the same communication protocol as that of the information obtaining apparatus 101 is operating (step S810). Further, the CPU 201 of the management apparatus 111 receives a result of execution in response to the device information obtaining request issued in the step 5810 from the device, and stores the execution result in the RAM 203 or the HD 211 (step S811).

Then, the CPU 201 of the management apparatus 111 determines whether or not it is necessary to change access settings in order for the information obtaining apparatus 101 to carry out the process in the step S405 in FIG. 4 (receipt of a user's operation on the device list screen) (step S812: a second determination unit). In the present embodiment, it is assumed that device information held by the management apparatus 111 is sent to the information obtaining apparatus 101, and the information obtaining apparatus 101 accesses the devices 113 to 115.

In this network system, management operations that have been closed within the IPV6 network environment 110 are carried out in both the IPV4 network environment 100 and the IPV6 network environment 110, and it is thus important to ensure communication security. Accordingly, in the step 3812, such settings as to maintain security even in management operations carried out in both the IPV4 network environment 100 and the IPV6 network environment 110 are configured for the device.

FIG. 10 shows an exemplary access setting changing screen 1000 for the device, which is displayed by the management apparatus 111. The CPU 201 of the management apparatus 111 must display the access setting changing screen 1000 to receive inputs from the user before carrying out the process in the step S812. Input values received from the user via the access setting changing screen 1000 are stored in the RAM 203 or the HD 211.

On the access setting changing screen 1000 are displayed an access setting change target device list 1010, checkboxes 1020 and 1030, a user name 1031, an authentication password 1032, an encryption password 1033, a context name 1034, and an OK button 1040.

The access setting change target device list 1010 is a list of a device name 1011, a product name 1012, an IPV4 address 1013, and an IPV6 address 1014 with respect to each of the device names 113 to 115. The device name 1011, the product name 1012, the IPV4 address 1013, and the IPV6 address 1014 are the same as the device name 910, the product name 920, the IPV4 address 930, and the IPV6 address 940, respectively, in FIG. 9.

Although in FIG. 10, all the devices on which information is obtained in the step S801 are targeted for changing of access settings, the access setting change target device list 1010 may have checkboxes so that an arbitrary device selected by the user can be targeted for changing of access settings.

When a checkmark is placed in the access permission list addition checkbox 1020 (an instruction unit) by the user, the CPU 201 of the management apparatus 111 sends an IP address of the information obtaining apparatus 101 stored in the RAM 203 or the HD 211 in the step S802 to the device, and adds (registers) the IP address of the information obtaining apparatus 101 to an access permission list which the device has.

When a checkmark is placed in the SNMPv3 authentication information setting checkbox 1030 (a setting unit) by the user, the CPU 201 of the management apparatus 111 sets information required for carrying out SNMPv3 authentication. Specifically, the device is requested to change an access method for use in obtaining information from the device to an access 1031, the authentication password 1032, the encryption password 1033, and the context name 1034 are information required for carrying out SNMPv3 authentication.

It should be noted that as information required for carrying out SNMPv3 authentication, there may be, for example, a "scope" for defining a range in which information is referred to by the user as well as the user name 1031, the authentication password 1032, the encryption password 1033, and the context name 1034 as described above. Further, although in FIG. 10, it is arranged such that the same SNMPv3 authentication information is set for all the devices, different values may be set for the respective devices.

When the user depresses the OK button 1040, values inputted to the access setting changing screen 1000 are stored in the RAM 203 or the HD 211. A procedure to follow in making an addition to the access permission list in the device and a procedure to follow in setting SNMPv3 authentication information will be described later.

Referring again to FIG. 8B, to check the access setting change information inputted by the user via the access setting changing screen 1000, the CPU 201 of the management apparatus 111 checks information stored in the RAM 203 or the HD 211 (step S812). When determining that a checkmark is not placed in neither the access permission list addition checkbox 1020 nor the SNMPv3 authentication information setting checkbox 1030, the CPU 201 of the management apparatus 111 proceeds to step S816.

When determining that a checkmark is placed in the access permission list addition checkbox 1020 or the SNMPv3 authentication information setting checkbox 1030, the CPU 201 of the management apparatus 111 transmits a request for changing of access settings (registration of the IP address of the information obtaining apparatus 101 in the access permission list) to the device (step S813: a second requesting unit) in accordance with the values inputted to the access setting changing screen 1000 by the user. Further, the CPU 201 of the management apparatus 111 receives, from the device, a result of the access setting changing request transmitted in the step S813, and stores the same in the RAM 203 or the HD 211 (step S814).

Then, the CPU 201 of the management apparatus 111 analyzes the result of the access setting changing request received from the device in the step S814, and determines whether or not the access settings have been successfully changed by the device (step S815). When the access settings have not been successfully changed by the device, the CPU 201 of the management apparatus 111 proceeds to the step S817. When the access settings have been successfully changed by the device, the CPU 201 of the management apparatus 111 creates a response to the device information obtaining request received from the information obtaining apparatus 101 in the step S802 using the device information table 900 (step S816: a creating unit). An example of the created response is as described above with reference to FIG. 6. After that, the CPU 201 of the management apparatus 111 proceeds to step S818.

When the process in the step S813 is carried out with a checkmark placed in the SNMPv3 authentication information setting checkbox 1030, the value of the information obtaining method 950 in FIG. 9 is rewritten from "SNMP" to "SNMPv3". Accordingly, the value of the information obtaining method 635 in the response created in the step S816 is also "SNMPv3". The device information stored in the device information 630 in FIG. 6 is comprised of only information on devices capable of communicating with the information obtaining apparatus 101.

When the determination result in the step S806 is "No", or when the determination result in the step S809 is "No", or when the determination result in the step S815 is "No", the CPU 201 of the management apparatus 111 creates a response that explicitly describes information on an error that has occurred (step S817). A method for explicitly describing the error is as described with reference to FIG. 6. After that, the CPU 201 of the management apparatus 111 proceeds to the step S818.

The CPU 201 of the management apparatus 111 sends the response created in the step S816 or the step S817 to the information obtaining apparatus 101 (step S818: a sending unit). In the step S402 in FIG. 4, the information obtaining apparatus 101 receives the response sent from the management apparatus 111 in the step S818. As a result, the CPU 201 of the management apparatus 111 completes the present process.

Referring next to FIGS. 11A, 11B, 12, and 13, a description will be given of processes carried out when the device has received various requests from the management apparatus 111 and the information obtaining apparatus 101.

Figure 11A:
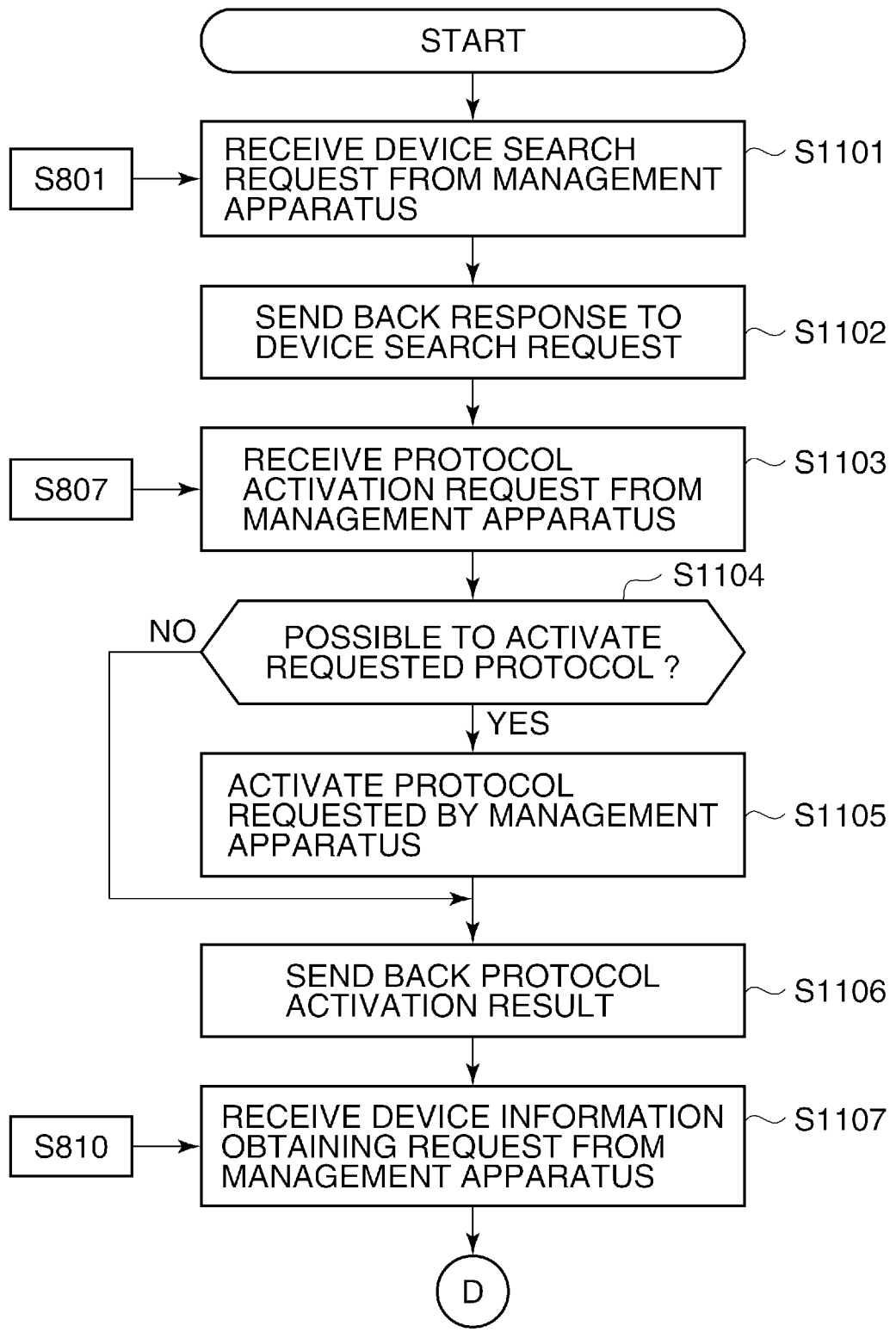
FIGS. 11A and 11B are flowcharts showing a process carried out when a network device has received various requests from the network device management apparatus and the network device information obtaining apparatus.
Figure 11B:
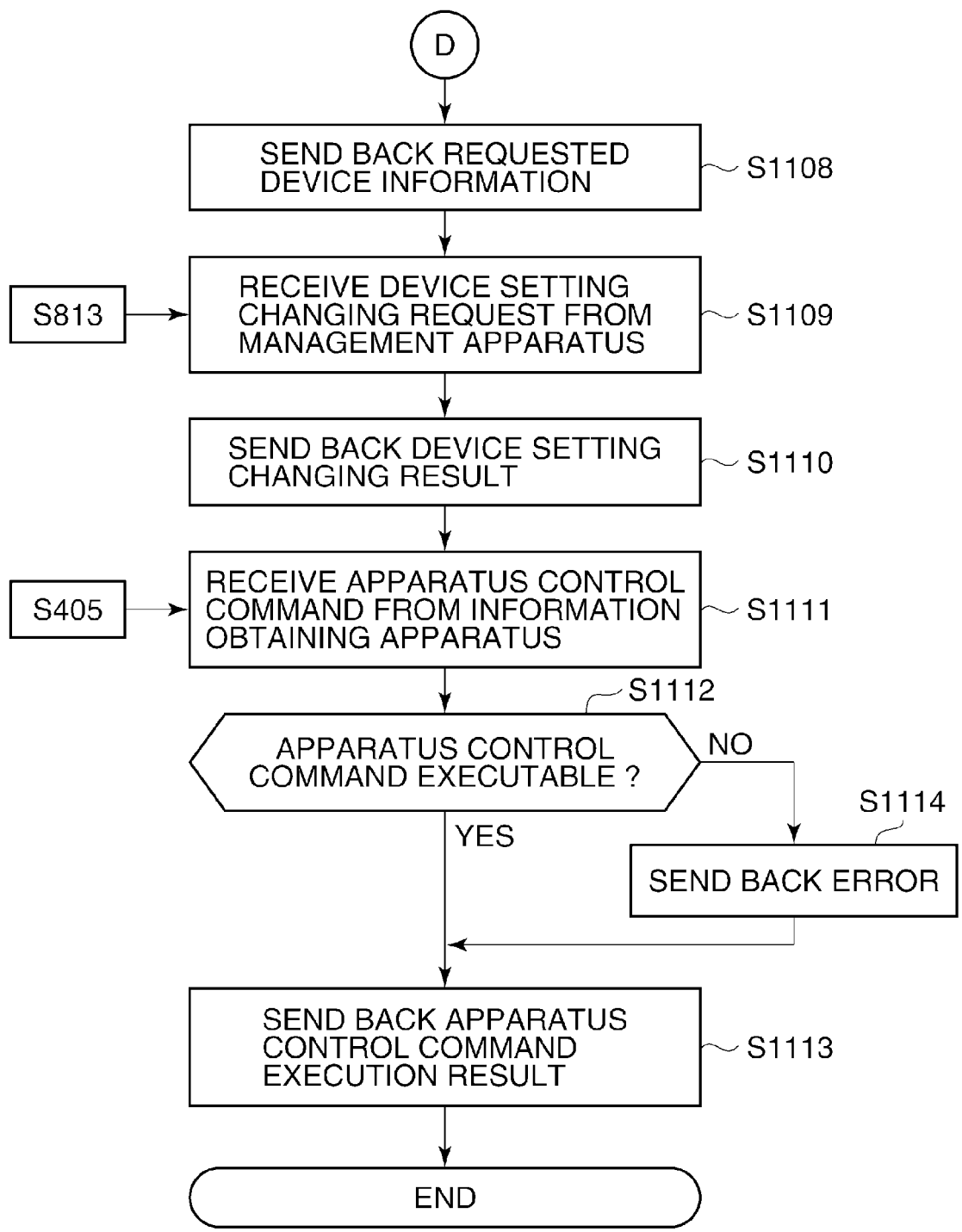

FIGS. 11A and 11B are flowcharts of a process carried out when the device received various requests from the management apparatus 111 and the information obtaining apparatus 101. The present process is carried out under the overall control of the core units 311 of the devices 113 to 115. It should be noted that in the description of the present embodiment, it is assumed that the device 113 carries out the present process.

Referring to FIGS. 11A and 11B, the core unit 311 of the device 113 receives a device search request issued by the management apparatus 111 in the step S801 in FIG. 8A (step S1101). Then, the core unit 311 of the device 113 sends back a response to the device search request to the management apparatus 111 (step S1102). The response sent back is as described above with reference to FIG. 9. Then, the core unit 311 of the device 113 receives a communication protocol activation request sent by the management apparatus 111 in the step S807 in FIG. 8A (step S1103).

Then, the core unit 311 of the device 113 determines whether or not it is possible to activate a communication protocol of which activation has been requested in the step S1103 (step S1104). When it is impossible to activate the communication protocol of which activation has been requested, the core unit 311 of the device 113 proceeds to step S1106. When it is possible to activate the communication protocol of which activation has been requested because the communication protocol is supported by the device 113, the core unit 311 of the device 113 activates the communication protocol of which activation has been requested (step S1105).

Then, the core unit 311 of the device 113 sends back a result of execution in the step S1104 and the step S1105 in response to the activation request received in the step S1103 to the management apparatus 111 (step S1106). Specifically, when the communication protocol for which the activation request was received in the step S1103 has been successfully activated, the core unit 311 of the device 113 sends back "success" as the execution result to the management apparatus 111. Otherwise, the core unit 311 of the device 113 sends back "failure" as the execution result to the management apparatus 111.

Then, the core unit 311 of the device 113 receives a request for obtainment of device information regarding a communication protocol, which is issued by the management apparatus 111 in the step S810 in FIG. 8B (step S1107). Then, the core unit 311 of the device 113 sends back device information regarding a communication protocol, of which obtaining has been requested, to the management apparatus 111 (step S1108). Then, the core unit 311 of the device 113 receives an access setting changing request sent by the management apparatus 111 in the step S813 in FIG. 8B (step S1109). Then, the core unit 311 of the device 113 changes access settings of the device 113 itself, and sends back a setting changing result to the management apparatus 111 (step S1110).

Figure 12:
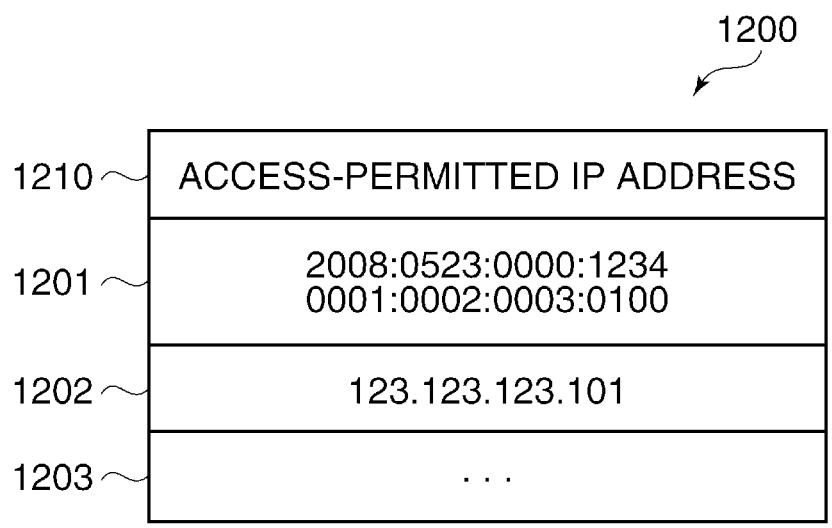
FIG. 12 is a diagram showing an exemplary access permission list in a case where a network device has changed access settings for the device in response to a request from the network device management apparatus.

FIG. 12 shows an exemplary access permission list in a case where access settings of the device 113 have been changed in accordance with a request from the management apparatus 111. The access permission list 1200 is stored in, for example, the external storage device 307, and has access-permitted IP addresses 1210 (IP addresses 1201, 1203, and 1203). The IP addresses 1201, 1203, and 1203 are exemplary IP addresses permitted to access the device 113.

In the present embodiment, the IPV4 address of the information obtaining apparatus 101 ("123.123.123.101") is stored as the IP address 1201 as described above in the description of the step S802 in FIG. 8A. Although in the present embodiment, there are both IPV4 addresses and IPV6 addresses in the access permission list, the present invention is not limited to this. Different access permission lists may be prepared for IPV4 addresses and IPV6 addresses.

Figure 13:
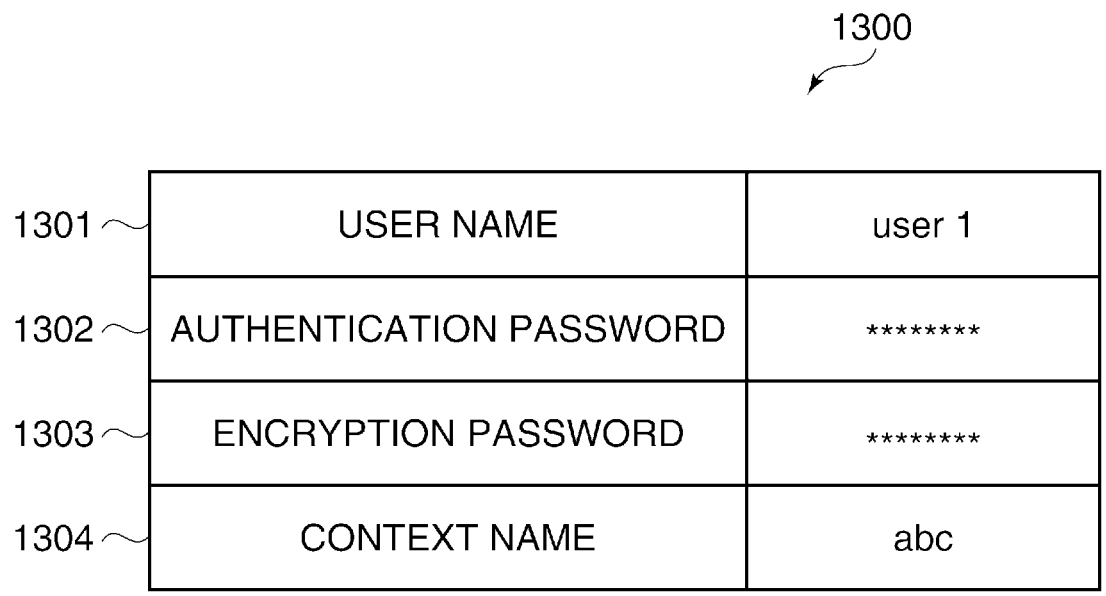
FIG. 13 is a diagram showing an SNMPv3 authentication information setting table in a case where access settings for the device have been changed in response to a request from the network device management apparatus.

FIG. 13 shows an SNMPv3 authentication information setting table in a case where access settings of the device 113 have been changed in accordance with a request from the management apparatus 111. The SNMPv3 authentication information setting table 1300 is stored in, for example, the external storage device 307, and has a user name 1301, an authentication password 1302, an encryption password 1303, and a context name 1304. The user name 1301, the authentication password 1302, the encryption password 1303, and the context name 1304 correspond to the user name 1031, the authentication password 1032, the encryption password 1033, and the context name 1034, respectively, in FIG. 10.

It should be noted that as component elements of the SNMPv3 authentication information setting table 1300, there may be, for example, a "scope" for defining a range in which information is referred to by the user as well as the user name 1301, the authentication password 1302, the encryption password 1303, and the context name 1304 mentioned above. Further, although in FIG. 13, it is arranged such that only one piece of SNMPv3 authentication information can be set for the device 113, it may be arranged such that a plurality of pieces of SNMPv3 authentication information can be set for the device 113.

Referring again to FIG. 11B, the core unit 311 of the device 113 receives an apparatus control command issued by the information obtaining apparatus 101 in the step S405 in FIG. 4 (step S1111). An exemplary apparatus control command which the device 113 receives is as described above in the description of the step S405 in FIG. 4. Then, the core unit 311 of the device 113 determines whether or not the device 113 can execute the apparatus control command (step S1112).

Specifically, the core unit 311 of the device 113 refers to the access permission list 1200 and the SNMPv3 authentication information setting table 1300. Then, the core unit 311 of the device 113 determines whether or not it is possible to access the device 113 from the information obtaining apparatus 101, and then determines whether or not it is possible to process the apparatus control command.

When the device 113 can execute the apparatus control command, the core unit 311 of the device 113 executes the apparatus control command, and sends back a result of the execution to the information obtaining apparatus 101 (step S1113). In the case of the exemplary apparatus control command (1) described in the step S405, the core unit 311 of the device 113 sends back information on the device 113, and in the case of the exemplary apparatus control command (2) described in the step S405, the core unit 311 of the device 113 changes setting values for the device 113 and then sends back a result of the change. When the device 113 cannot execute the apparatus control command, the core unit 311 of the device 113 does not execute the apparatus control command, and sends back an error to the information obtaining apparatus 101 (step S1114). As a result, the core unit 311 of the device 113 completes the present process.

As described above in detail, effects explained hereafter can be obtained according to the present embodiment. The information obtaining apparatus operating in the IPV4 network environment 100 can obtain device information which the management apparatus present in the subnetwork other than the subnetwork to which the information obtaining apparatus itself belongs (the IPV6 network environment 110) has.

Moreover, the information obtaining apparatus can properly manage devices present in the subnetwork other than the subnetwork to which the information obtaining apparatus itself belongs using device information obtained from the management apparatus.

Other Embodiments aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-138237 filed Jun. 9, 2009, which is hereby incorporated by reference herein in its entirety.

What is claimed is:

1. A device management apparatus for communicating with an information obtaining apparatus operating in a second network connected to a first network, and managing a device connected to the first network, the device management apparatus comprising:
a controller programmed to provide:
an extracting task that, when receiving a device information obtaining request from the information obtaining apparatus, extracts a communication protocol usable by the information obtaining apparatus from the device information obtaining request;
a first requesting task that, when the device connected to the first network is not currently operating using the communication protocol extracted by said extracting task, and the device is able to activate the communication protocol, requests the device to activate the communication protocol;
a second requesting task that, when the device has successfully activated the communication protocol in response to the request from said first requesting task, and access settings for the device need to be changed, requests the device to change the access settings;
a creating task that, when the device has successfully changed the access settings in response to the request from said second requesting task, creates a response concerning device information to the information obtaining apparatus; and
a sending task that sends the response created by said creating task to the information obtaining apparatus; and
an instruction task that gives an instruction to change the access settings for the device connected to the first network,
wherein in accordance with the instruction to change the access settings by said instruction task, said second requesting task registers an address of the information obtaining apparatus on an access permission list which the device has.

2. The device management apparatus as claimed in claim 1, wherein the controller is further programmed to provide:
a first determination task that, when the device connected to the first network is not currently operating using the communication protocol extracted by said extracting task, determines whether the device is enable to activate the communication protocol by changing settings of the device; and
a second determination task that, when the device has successfully activated the communication protocol in response to the request from said first requesting task, determine whether the access settings for the device need to be changed.

3. The device management apparatus as claimed in claim 1, wherein the controller is further programmed to provide:
an obtaining task that obtains device information by searching the device connected to the first network,
wherein the device information includes any one of a device name, an address on the first network, an address on the second network, or an information obtaining method.

4. The device management apparatus as claimed in claim 1, wherein the controller is further programmed to provide:
a setting task that sets authentication information for use in accessing the device connected to the first network,
wherein based on the setting of the authentication information by said setting task, said second requesting task requests the device to change an access method for use in obtaining information from the device to an access method that uses the authentication information.

5. A control method for a device management apparatus for communicating with an information obtaining apparatus operating in a second network connected to a first network, and managing a device connected to the first network, the method comprising:
an extracting step of, when receiving a device information obtaining request from the information obtaining apparatus, extracting a communication protocol usable by the information obtaining apparatus from the device information obtaining request;
a first requesting step of, when the device connected to the first network is not currently operating using the communication protocol extracted in said extracting step, and the device is able to activate the communication protocol, requesting the device to activate the communication protocol;
a second requesting step of, when the device has successfully activated the communication protocol in response to the request in said first requesting step, and access settings for the device need to be changed, requesting the device to change the access settings;
a creating step of, when the device has successfully changed the access settings in response to the request in said second requesting step, creating a response concerning device information to the information obtaining apparatus; and
a sending step of sending the response created in said creating step to the information obtaining apparatus; and an instruction step of giving an instruction to change the access settings for the device connected to the first network, wherein in accordance with the instruction to change the access settings by said instruction step, said second requesting step registers an address of the information obtaining apparatus on an access permission list which the device has.

6. A non-transitory storage medium storing a program having a computer-readable program code executable by a computer to execute a control method for a device management apparatus for communicating with an information obtaining apparatus operating in a second network connected to a first network, and managing a device connected to the first network, the method comprising:

an extracting step of, when receiving a device information obtaining request from the information obtaining apparatus, extracting a communication protocol usable by the information obtaining apparatus from the device information obtaining request;

a first requesting step of, when the device connected to the first network is not currently operating using the communication protocol extracted in said extracting step, and the device is able to activate the communication protocol, requesting the device to activate the communication protocol;

a second requesting step of, when the device has successfully activated the communication protocol in response to the request in said first requesting step, and access settings for the device need to be changed, requesting the device to change the access settings;

a creating step of, when the device has successfully changed the access settings in response to the request in said second requesting step, creating a response concerning device information to the information obtaining apparatus;

a sending step of sending the response created in said creating step to the information obtaining apparatus; and an instruction step of giving an instruction to change the access settings for the device connected to the first network, wherein in accordance with the instruction to change the access settings by said instruction step, said second requesting step registers an address of the information obtaining apparatus on an access permission list which the device has.

* * * * *